United States Patent
Harris, Jr. et al.

(10) Patent No.: US 7,104,682 B2
(45) Date of Patent: Sep. 12, 2006

(54) SYSTEM AND METHOD FOR DETERMINING TEMPERATURE OF FOOD

(75) Inventors: Kenneth David Harris, Jr., Nashua, NH (US); Joseph Geringer, Merrimack, NH (US); David R. Killebrew, Fremont, CA (US); Pamela Kaminstein, Wilton, NH (US); Steven J. Schwartz, Bedford, NH (US)

(73) Assignee: Brockstone Purchasing, Inc., Merrimack, NH (US)

( * ) Notice: Subject to any disclaimer, the term of this patent is extended or adjusted under 35 U.S.C. 154(b) by 0 days.

(21) Appl. No.: 10/797,269

(22) Filed: Mar. 10, 2004

(65) Prior Publication Data

US 2005/0201445 A1    Sep. 15, 2005

(51) Int. Cl.
*G01K 1/08* (2006.01)
*A47J 43/28* (2006.01)

(52) U.S. Cl. ............... 374/155; 374/208; 374/163; 30/137; 30/322

(58) Field of Classification Search ............... 374/155
See application file for complete search history.

(56) References Cited

U.S. PATENT DOCUMENTS

| | | | |
|---|---|---|---|
| 3,552,210 A * | 1/1971 | Wright, Jr. ............... 374/155 |
| 3,742,602 A * | 7/1973 | Brumwell ............... 30/340 |
| 5,066,242 A * | 11/1991 | Martucci ............... 439/281 |
| 5,699,614 A * | 12/1997 | Garneau, Sr. ............... 30/142 |
| 5,983,783 A | 11/1999 | Archard et al. |
| 6,065,391 A | 5/2000 | Archard et al. |
| D437,794 S | 2/2001 | Archard et al. |
| D448,610 S * | 10/2001 | Saunders et al. ............... D7/395 |
| 6,412,398 B1 | 7/2002 | Norcross et al. |
| 6,539,842 B1 * | 4/2003 | Chapman et al. ............... 99/342 |
| 6,568,848 B1 | 5/2003 | Chapman et al. |
| 6,591,739 B1 | 7/2003 | Norcross |
| 6,712,505 B1 | 3/2004 | Chapman et al. |
| 6,759,635 B1 | 7/2004 | Lile |
| 6,811,308 B1 | 11/2004 | Chapman et al. |
| D505,842 S | 6/2005 | Harris, Jr. et al. |
| 2002/0009121 A1 * | 1/2002 | Siu ............... 374/155 |
| 2002/0124737 A1 * | 9/2002 | Bedetti et al. ............... 99/342 |
| 2003/0097759 A1 * | 5/2003 | Bond et al. ............... 30/340 |
| 2004/0123469 A1 * | 7/2004 | Wilkinson et al. ............... 30/137 |

FOREIGN PATENT DOCUMENTS

WO    WO 9937981 A1 *    7/1999

OTHER PUBLICATIONS

The Sharper Image® All-In-One Grill Fork Meat & Fish Thermometer M1220 Instructions, Jun. 2002, 7 pgs.

* cited by examiner

*Primary Examiner*—Diego Gutierrez
*Assistant Examiner*—Mirellys Jagan
(74) *Attorney, Agent, or Firm*—Nixon Peabody, LLP (57) ABSTRACT

A device for checking the internal temperature of food, which includes a piercing element for insertion into food and a temperature sensor integral with the piercing element. The piercing element is connected to a main handle, which is removably connected to a handle portion. The handle portion contains a display, electronically connected to the temperature sensor, whereby the temperature sensed by the temperature sensor and, in some embodiments, the level of doneness is displayed by the display. In this embodiment, the piercing element and main handle are dishwasher safe and can be inserted safely into a dishwasher when the handle portion, containing a substantial portion of the electronics, is removed.

25 Claims, 11 Drawing Sheets

SYSTEM AND METHOD FOR DETERMINING TEMPERATURE OF FOOD

TECHNICAL FIELD

The present invention is generally related to cooking tools. More particularly, the present invention is related to a system and method of determining the temperature of food.

BACKGROUND OF THE INVENTION

Various food products are of a type that can be prepared or cooked in accordance with taste preferences of the person or persons expected to consume the food item. Meat items, in particular, are cooked to taste preferences of a specific person. Such meat items may include steaks, pork chops, hamburger patties, roasts, rolls, racks and the like. For some such meat items, including beef, veal and lamb, a cooking selection often is made from known taste preferences or health requirements, including rare, medium rare, medium, medium well, and well done.

Food thermometers have been used to indicate an amount that a food product is cooked, referred to herein as its "doneness". Most of these food thermometers incorporate a probe that is inserted into the food. The probe is in operative communication with a temperature-measuring device. In certain food thermometers, the user is required to insert the probe into the food item prior to, or in the early stages of cooking, particularly when the food is being cooked in an enclosed oven, grill or the like.

Many food thermometers provide a direct reading of the temperature of the cooking food at the location of the probe. With this approach, the user is required to be aware of the significance of the food temperature insofar as it correlates to the extent of doneness that is desired or required for a particular type of meat, or other food item. Most individuals are entirely unaware as to what temperature the interior of a chicken breast, for instance, needs to be cooked, instead relying on an interior or exterior color of the cooking food. A device is needed that can provide not only the temperature of cooking food, but also a level of doneness of the food.

Other food thermometers provide an indicator, such as a pop-up element, that is activated when a threshold temperature is reached in accordance with a predetermined extent of doneness. This approach can be especially useful for food products that are not cooked according to typical selected doneness levels, but instead achieve an accepted doneness level upon reaching a single selected temperature. In general, food thermometers of this type are not adjustable. In addition, typically no means are provided for informing the user whether the "done" signal had just occurred or had occurred previously. In the latter event, the desired degree of doneness could have been far surpassed by the time the user recognizes that the food is done, resulting in overcooking of a food item.

Typical food thermometers that contain electronic components have a further drawback in that they are not dishwasher safe. Electronic items can be damaged if water penetrates their internal circuitry. The contents of dishwashers can normally expect to be attacked with jets of scalding hot water. As a result, most previously devised food preparation tools containing electronic circuitry, such as food thermometers having electronic components, are, as a rule, not considered dishwasher safe.

Food thermometers that are limited to reporting a temperature require a knowledgeable user and diligent monitoring of temperature changes. In addition, food thermometers that are limited to providing only a done indication function typically are not adjustable and likewise require careful and diligent attention to avoid overcooking so that cooking can be stopped or reduced promptly after a doneness indicator has become activated. Food thermometers containing electronic circuitry are not dishwasher safe.

Thus, a heretofore unaddressed need exists in the industry to address the aforementioned deficiencies and inadequacies.

SUMMARY OF THE INVENTION

Embodiments of the present invention provide an apparatus, method and system for a dishwasher-safe and hand-wash safe tool used for determining food temperature.

Briefly described, in architecture, one embodiment of the system, among others, can be implemented as follows. The embodiment includes a piercing element for insertion into food and a temperature sensor integral with the piercing element. The piercing element is connected to a main handle. In addition, a handle portion is removably connected to the main handle. The handle portion contains a display, electronically connected to the temperature sensor, whereby the temperature sensed by the temperature sensor is displayed by the display. In this embodiment, the piercing element and main handle are dishwasher safe and can be inserted safely into a dishwasher when the handle portion is removed.

The present invention can also be viewed as providing methods for cleaning a food temperature-determining tool in a dishwasher. In this regard, one embodiment of such a method, among others, can be broadly summarized by the following steps: taking a tool having a piercing element, a temperature sensor integral with the piercing element, a main handle connected to the piercing element, and a handle portion removably, connected to the main handle, having a display integral within the handle portion, electronically connected to the temperature sensor; removing the handle portion from the main handle; inserting the main handle, connected to the piercing element, into the dishwasher; and initiating the dishwasher.

The present invention can further be viewed as providing a system for determining food temperature with a dishwasher-safe tool. The system includes a means for sensing the temperature of the food. The system includes a means for gripping the sensing means for sensing the temperature. The system includes a means for displaying, in some form, the temperature of the food items. And the system includes a means for temporarily separating the means for displaying from the means for sensing the temperature thereby permitting washing the means for sensing the temperature without damaging the means for displaying.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
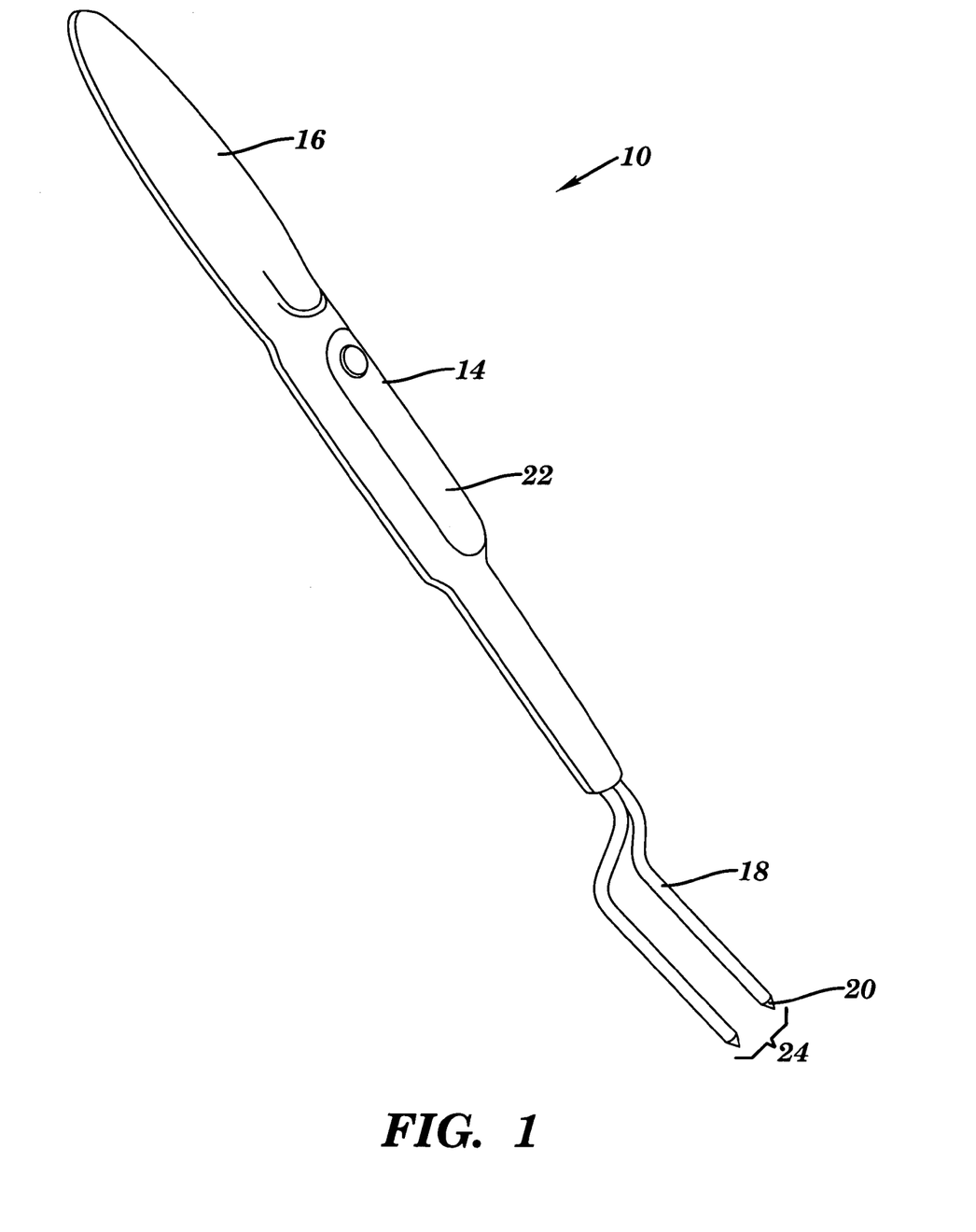
FIG. 1 is a perspective view of a first exemplary embodiment of the present invention.
Figure 2:
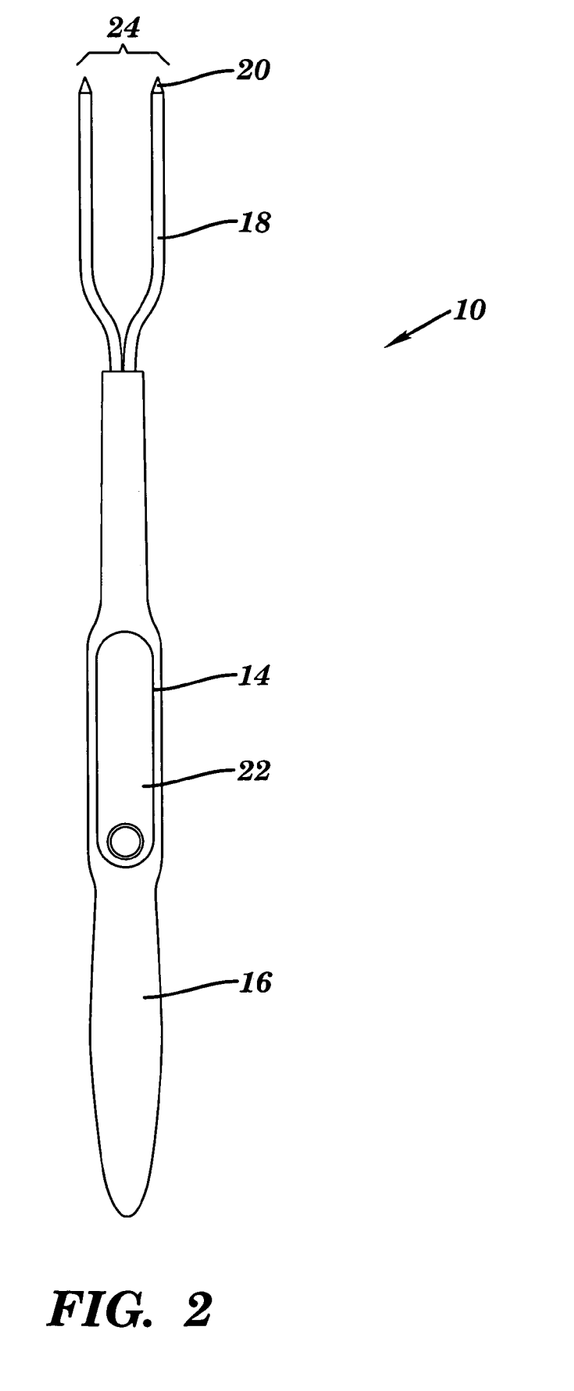
FIG. 2 is a top view of the first exemplary embodiment of the present invention shown in FIG. 1.
Figure 3:
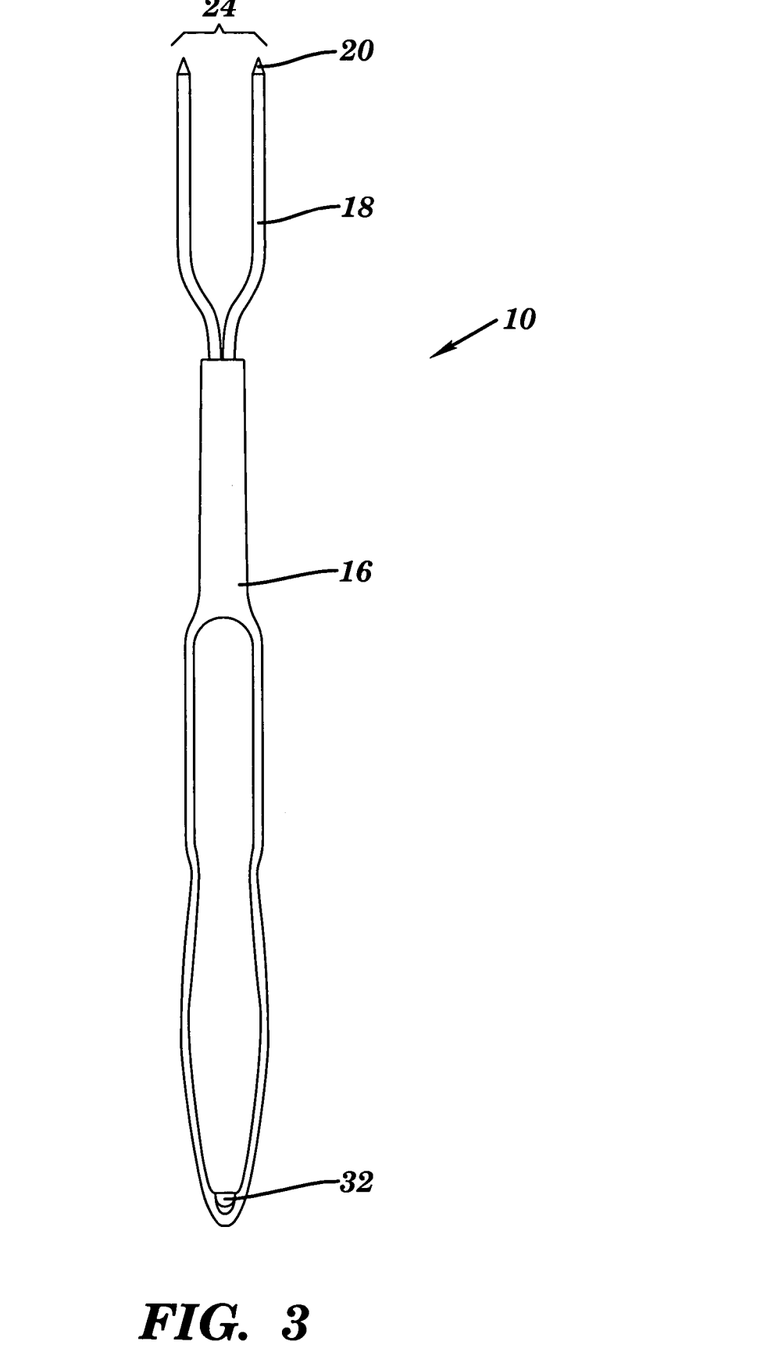
FIG. 3 is a bottom view of the first exemplary embodiment of the present invention shown in FIG. 1 and FIG. 2.

In a first exemplary embodiment, as shown in a perspective view in FIG. 1, a top view in FIG. 2, and a bottom view in FIG. 3, the food thermometer 10 includes a piercing element 18 designed for insertion into food, and a temperature sensor 20 integral with the piercing element 18. In the first exemplary embodiment, the piercing element 18 is a multi-tined fork 24. The piercing element 18 is connected to a main handle 16. A handle portion 14 of the food thermometer 10 is removably connected to the main handle 16. The handle portion 14 is mechanically removed from the main handle 16, in this exemplary embodiment, by using handle portion tab 32. The handle portion 14 contains a display 22 and the electronics related thereto, as is explained in detail herein. The display 22 is electronically connected to the temperature sensor 20, whereby a temperature sensed by the temperature sensor 20 is displayed on the display 22 in at least one of many possible forms. The piercing element 18 and main handle 16 are dishwasher safe and can be inserted safely into a dishwasher when the handle portion 14 is removed from the main handle 16.

Figure 4:
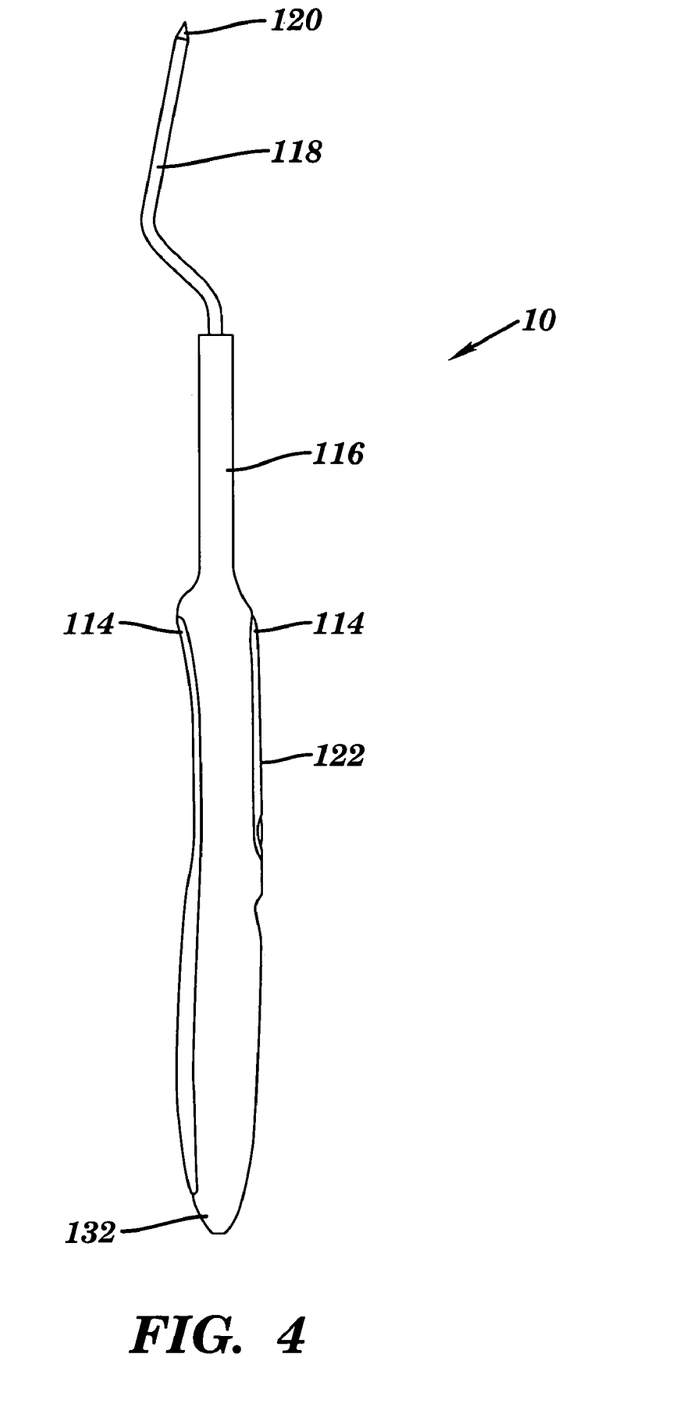
FIG. 4 is a side view of a second exemplary embodiment of the present invention.

In a second exemplary embodiment, as shown in a side view in FIG. 4, the food thermometer 110 includes a single piercing element 118 designed for insertion into food and a temperature sensor 120 integral with the piercing element 118. It should be noted that unlike in the first exemplary embodiment, the piercing element 118 of the second exemplary embodiment contains a single tine or elongated member. The piercing element 118 is connected to a main handle 116. In addition, a handle portion 114 of the food thermometer 110 is removably connected to a main handle 116. The handle portion 114 may be mechanically removed from the main handle 116, in this exemplary embodiment, by using a handle portion tab 132. The handle portion 114 contains a display 122 and the electronics related thereto. The display 122 is electronically connected to the temperature sensor 120, whereby a temperature sensed by the temperature sensor 120 is displayed on the display 122 in at least one of many possible forms. The piercing element 118 and main handle 116 are dishwasher safe and can be inserted safely into a dishwasher when the handle portion 114 is removed from the main handle 116.

Figure 5:
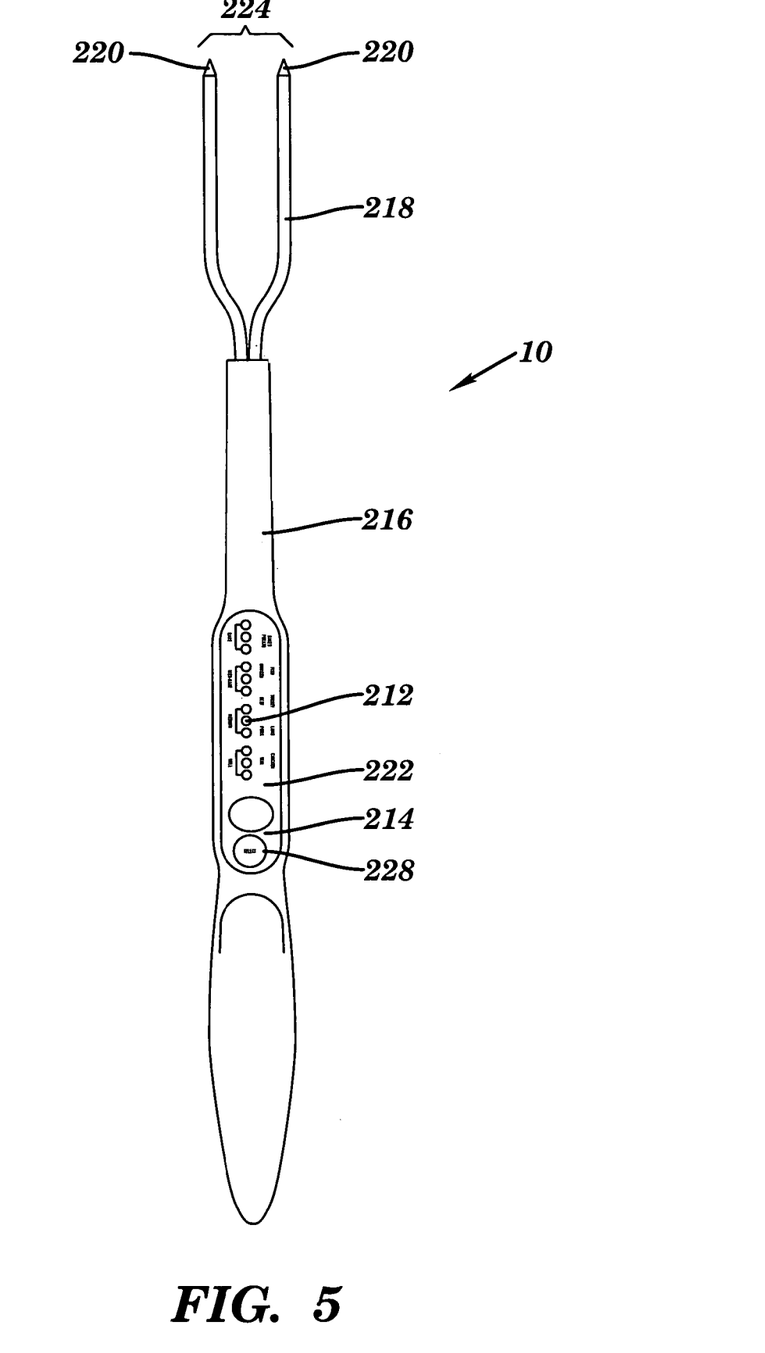
FIG. 5 is a top view of a third exemplary embodiment of the present invention.

In a third exemplary embodiment, as shown in a top view in FIG. 5, the food thermometer 210 includes a piercing element 218 designed for insertion into food and a temperature sensor 220 integral with the piercing element 218. In this third exemplary embodiment, the piercing element 218 is a multi-tined fork 224. The piercing element 218 is connected to a main handle 216. In addition, a handle portion 214 of the food thermometer 210 is removably connected to the main handle 216. The handle portion 214 contains a display 222, including a doneness scale 212 and electronics related thereto, including a selector switch 228 for selecting food items available for selection on the doneness scale 212. The display 222 is electronically connected to the temperature sensor 220, whereby the temperature sensed by the temperature sensor 220 results in a doneness determination, which is displayed on the doneness scale 212. Operation of the doneness scale is explained further, herein. The piercing element 218 and main handle 216 are dishwasher safe and can be inserted safely into a dishwasher when the handle portion 214 is removed from the main handle 216.

Figure 9:
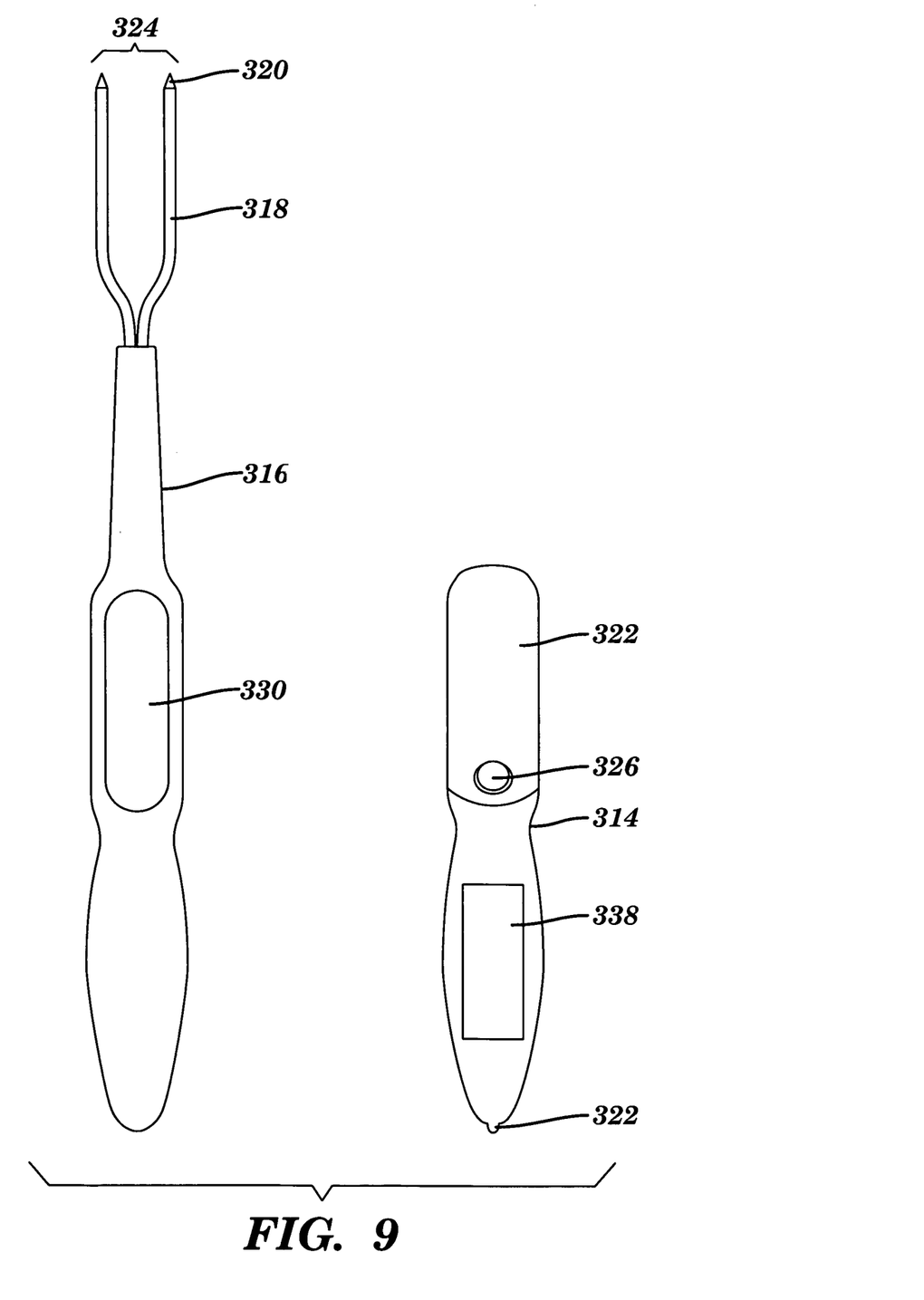
FIG. 9 is a top view of a fourth exemplary embodiment of the present invention showing the main handle and handle portion separated.

In a fourth exemplary embodiment, as shown in a top view in FIG. 9, the food thermometer 310 includes a piercing element 318 designed for insertion into food and a temperature sensor 320 integral with the piercing element 318. The piercing element 318 is connected to a main handle 316. In addition, a handle portion 314 is mechanically and electrically connectable to a main handle 316 at an opening 330 within the main handle portion 316. The handle portion 314 is mechanically connected to the main handle 316, in this exemplary embodiment, by using a handle portion tab 332. The handle portion 314 contains a display 322, a removable cover 338, behind which batteries are inserted, and the electronics related thereto. The display 322 is electronically connected to the temperature sensor 320, when the handle portion 314 and main handle 316 are electrically connected, whereby the temperature sensed by the temperature sensor 320 is displayed on the display 322 in at least one of many possible forms. The piercing element 318 and main handle 316 are dishwasher safe and can be inserted safely into a dishwasher when the handle portion 314 is removed.

Returning to FIG. 1, FIG. 2, and FIG. 3, the food thermometer 10 is useful for piercing and automatically measuring food temperature. Specifically, the piercing element 18 is inserted into food, such as chicken or beef, and a temperature of the food is provided to the user on the display 22. The food thermometer 10 further features a removable handle portion 14 in the main handle 16. The handle portion 14 contains a substantial portion of the electronics of the food thermometer 10, including the display 22. Removing the handle portion 16allows the remaining portion of the food thermometer 10 to be washed in the dishwasher without risking water damage to electronics contained in the handle portion 16.

The piercing element 18 may be configured in any of a number of different designs. One design of the piercing element 118 may be as a single, thin rod ending in a point sharp enough to pierce most food items, as shown in the second exemplary embodiment in FIG. 4. Another design of the piercing element 18 may be a multi-tined fork 24, shown in FIG. 1, FIG. 2, and FIG. 3, with a temperature sensor 20 contained in only one tine on the multi-tined fork 24. In another design, the piercing element 218 may be the multi-tined fork 224 with temperature sensors 220 contained in a plurality of tines on the multi-tined fork 224, as shown in a third exemplary embodiment in FIG. 5. If multiple temperature sensors 220 are incorporated into the design of the piercing element 218, the sensed temperature could be an average of the results from each temperature sensor 220 or a sensed temperature may only be presented when all of the temperature sensors 220 produce the same result. Many variations and modifications may be made to the above-described piercing element 18, 118, 218 without departing substantially from the spirit and principles of the invention.

The display 222 may be configured in any of many different types of designs. One design of the display 222 is configured to show a temperature of a pierced food item. Another design of the display 222 may contain a doneness scale 212. A third design of the display 222 would both show the temperature of the pierced food item and use the doneness scale 212 as shown in the third exemplary embodiment in FIG. 5. A fourth design of the display 222 would make all or a portion of the display 222 rotatable, such that the display 222 could be rotated to a convenient, readable position for the user. In a fifth design of the display 322, as shown in FIG. 9, the food thermometer 310 further includes a motion sensor 326 arranged to rotate at least a portion of the display 322 independently, such that at least a portion of the display 322 is substantially upright, regardless of the position of the food thermometer 310. Many variations and modifications may be made to the above-described display 22, 122, 222, 322 designs without departing substantially from the spirit and principles of the invention.

One possible feature of the display 222 is the doneness scale 212, as shown in FIG. 5. In one design of the doneness scale 222 categories of rare, medium rare, medium and well done are available. Each doneness scale 212 category is associated with a temperature range, as well as a light source contained in the display 222. The light source may be operated in accordance with liquid crystal display technology, make use of light emitting diodes, or use another technology known to those having ordinary skill in the art. When the temperature sensor 220 in the food thermometer 210 senses a temperature, the temperature is compared to the temperature ranges associated with each doneness scale 212 category. Preferably, the temperature ranges are stored within a memory located within the handle portion 214. Once a category having a temperature range fitting the sensed temperature is located, the light source associated with that category of doneness is illuminated. The temperature ranges may be different for different types of food. In one design of the doneness scale 212, any of 9 different entrée choices may be selected for doneness measurement.

FIG. 5 shows one design of the doneness chart 212 within the display 222 for the food thermometer 10. In the display 222, nine food items are shown by name. A selector button 228 is used to scroll through each of the nine items, which illuminate as they are selected. When a user wishes to select a food item, the user simply presses the selector button 228, scrolling through the food items, until the food item the user wishes to select is illuminated. After a predetermined period of time, the illuminated food item is automatically becomes the selected food item. Alternatively, pressing the selector button 228 a second time may result in selecting the illuminated food item.

Figure 6:
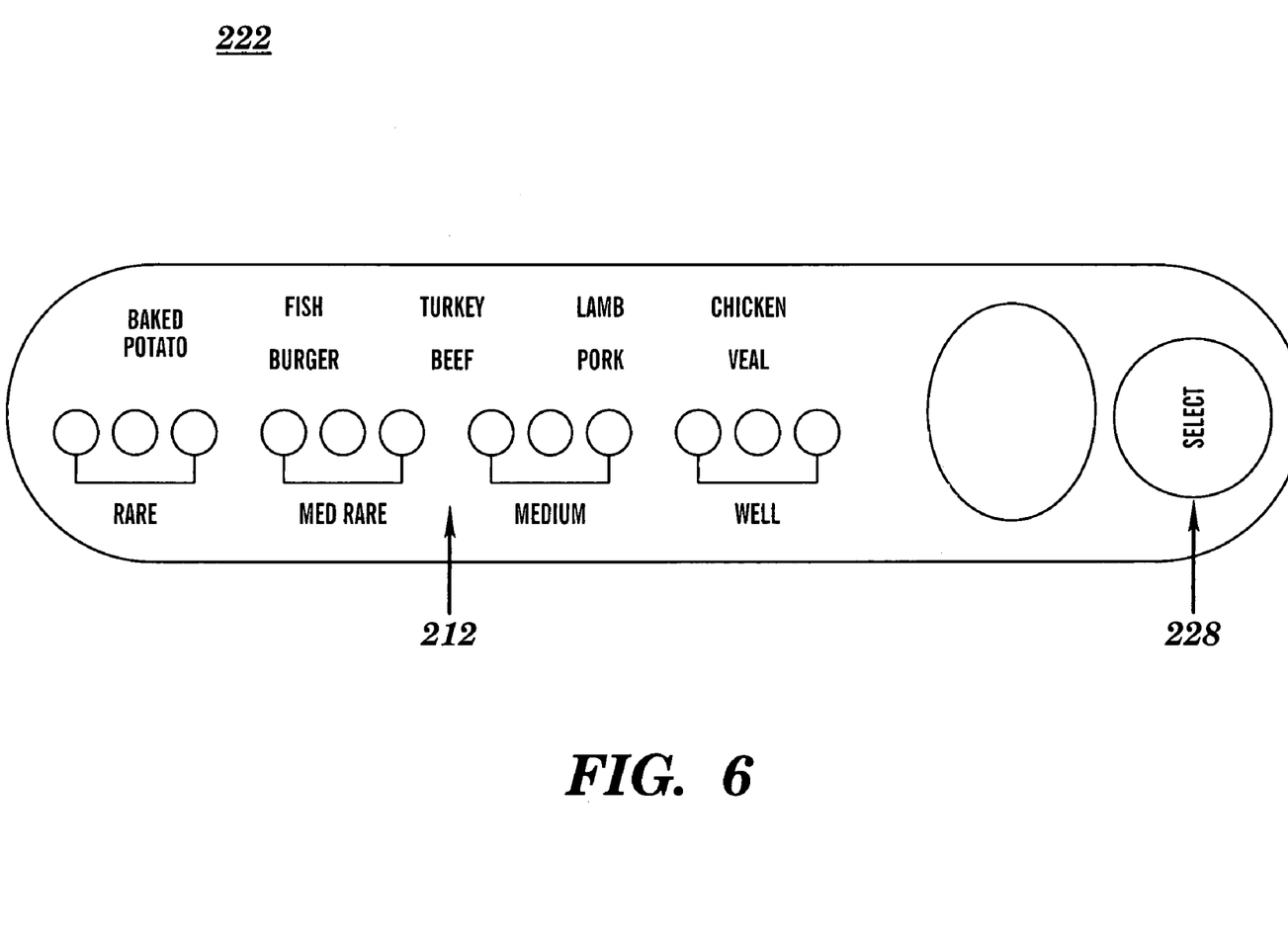
FIG. 6 is a top view of a display, according to the third exemplary embodiment of the invention.

Also shown in FIG. 6 is another design of the doneness chart 212. The doneness chart 212 contains four terms—Rare; Med. Rare; Medium; and Well—corresponding to four doneness levels. Three lights are above each of the four terms, each light corresponding to an incremental level of the associated doneness level. When the piercing element 218 is inserted into a selected food item, the temperature sensor 220 detects the temperature and that sensed temperature information is received by the electronics contained in the handle portion 214. The sensed temperature is compared to a doneness table, such as Table I shown below for beef, and the appropriate light on the doneness chart 212 is illuminated. Different food items (e.g., chicken, pork) have different temperature ranges associated with the doneness levels. Many variations and modifications may be made to the above-described doneness chart 212 designs without departing substantially from the spirit and principles of the doneness chart 212 and the invention.

TABLE I

Beef Doneness Chart

| Doneness | Light | Temperature Range (° F.) |
|---|---|---|
| Rare | First light | 0–124 |
| Rare | Second light | 125–127 |
| Rare | Third light | 128–129 |
| Med. Rare | First light | 130–134 |
| Med. Rare | Second light | 135–137 |
| Med. Rare | Third light | 138–139 |
| Medium | First light | 140–144 |
| Medium | Second light | 145–149 |
| Medium | Third light | 150–154 |
| Well | First light | 155–159 |
| Well | Second light | 160–165 |
| Well | Third light | 166–170 |

Figure 10:
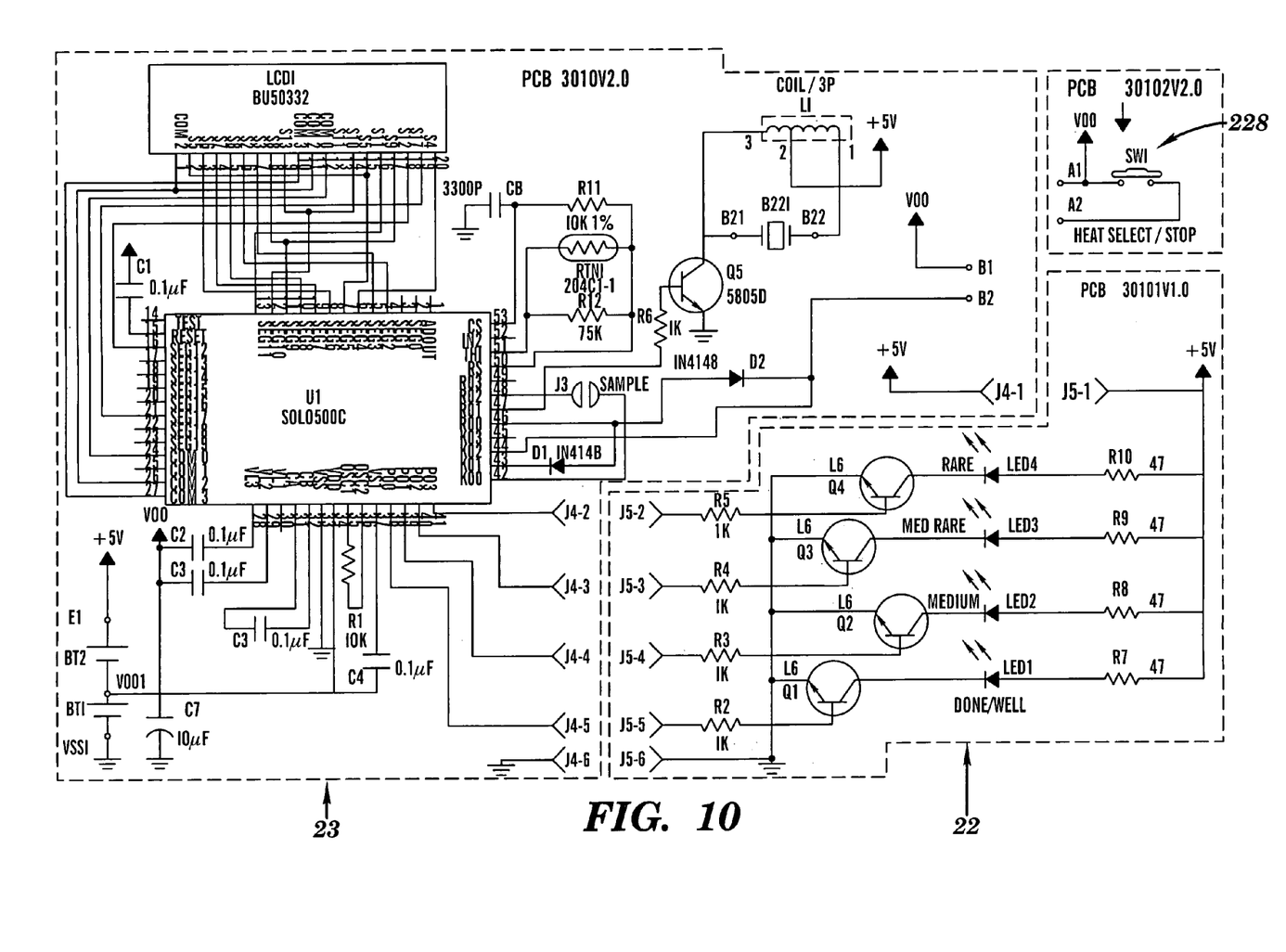
FIG. 10 is a schematic diagram illustrating an exemplary wiring schema of the invention.

FIG. 10 illustrates exemplary digital circuitry for the food thermometer discussed herein. Such digital circuitry can be embodied in a microchip or in another suitable carrier. As is generally appreciated in the art, the switches depicted tie voltage levels to input pins of the chip. A suitable battery of 1.5 volts can provide power. Two AAA dry cell batteries are usually satisfactory for this purpose and are received in the handle portion 314. It will be appreciated that, in this illustrated embodiment, appropriate electrical connections or other electronic communication is provided between the circuitry 23 of FIG. 10 and the display 22. FIG. 10 also illustrates the selector switch 228. Many variations and modifications may be made to the above-described digital circuitry designs without departing substantially from the spirit and principles of the invention.

Figure 7:
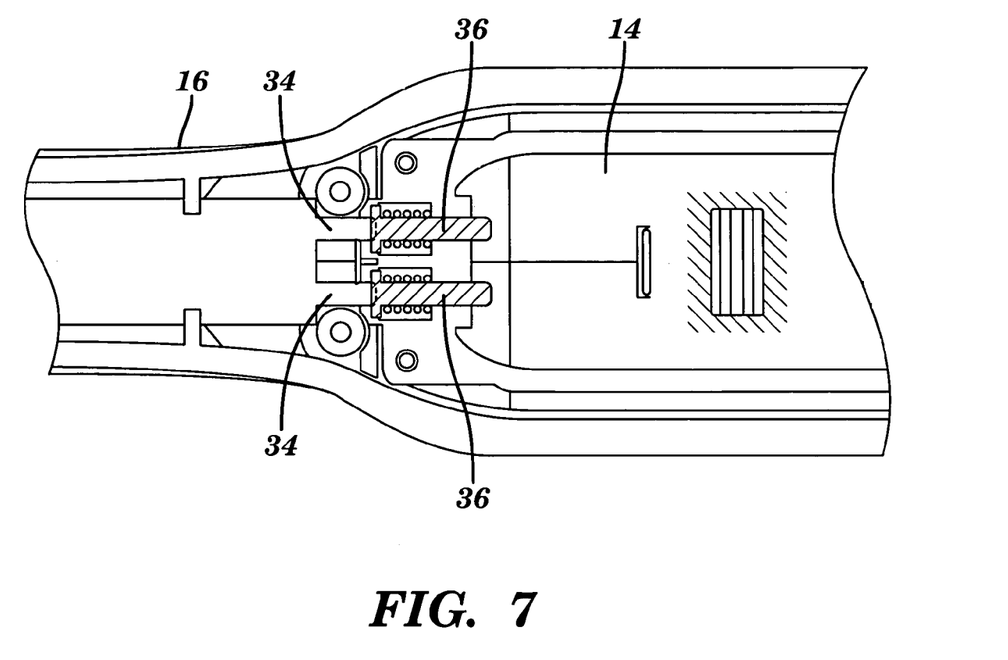
FIG. 7 is a cross-sectional view of an electrical connection between the main handle and the handle portion, in accordance with the first exemplary embodiment of the invention.
Figure 8:
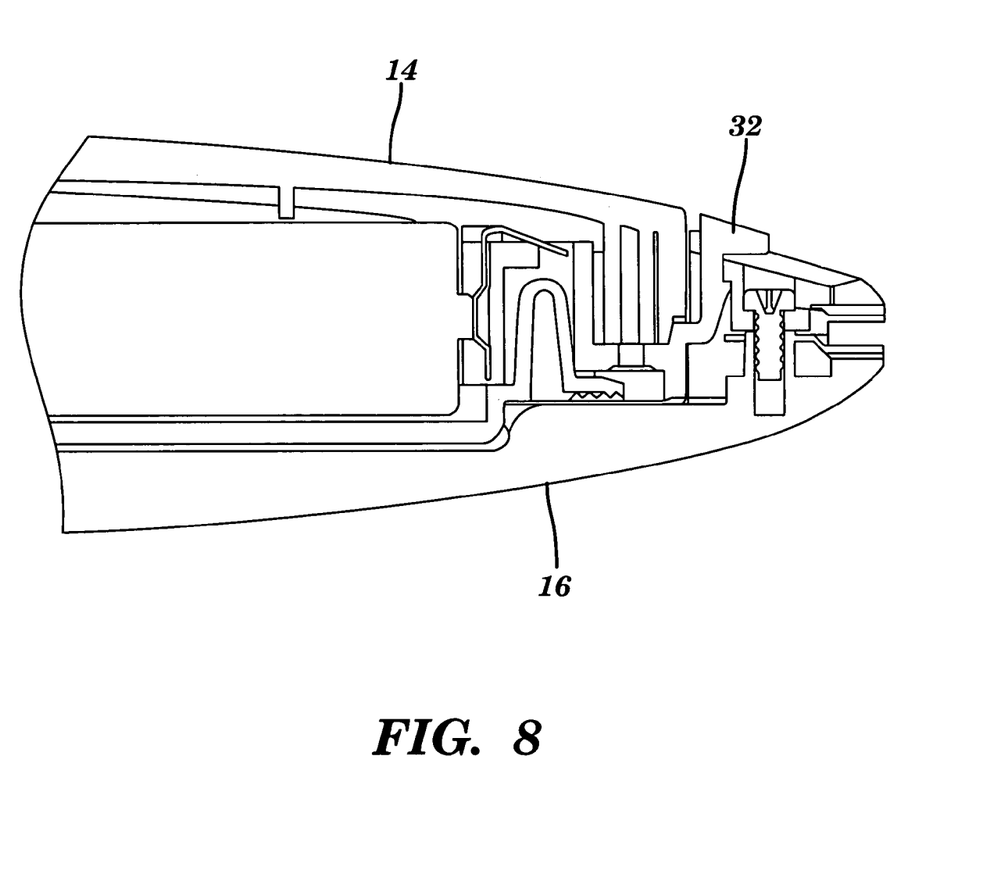
FIG. 8 is a cross-sectional view of a latching mechanism that connects the main handle and the handle portion, in accordance with the first exemplary embodiment of the invention.

Designs for the connection between the main handle 16 and the handle portion 14 are shown in FIG. 7, FIG. 8, and FIG. 9. In FIG. 9, the fourth exemplary embodiment, an opening 330 is formed in the main handle 316 to tactilely receive the handle portion 314, which may be released again by pushing on a handle portion tab 332. FIG. 9 further depicts a removable cover 338, in the handle portion 314, covering one or more slots for receiving batteries.

FIG. 8 is a cross-sectional view of a latching mechanism that connects the main handle 16 to the handle portion 14, according to the first exemplary embodiment. Specifically, the handle portion tab 32 is pushed toward the rest of the handle portion 14 to release the handle portion 14 from the main handle 16.

As shown in FIG. 7, which shows a cross-sectional view of an electrical connection between the main handle 16 and the handle portion 14, the main handle 16 has two rigidly formed leads 34 protruding into the opening 30. The handle portion 14 has two spring-loaded contacts 36 positioned to mate with the leads 34 when the main handle 16 tactilely receives the handle portion 14. In one alternative design, the main handle 16 may be equipped with two springs protruding into the opening 30, wherein the handle portion 14 has two contacts positioned to mate with the springs when the main handle 16 tactilely receives the handle portion 14. In another alternative design of the electrical connection between the main handle 16 and the handle portion 14, the main handle 16 may have two round bearings protruding into the opening 30, wherein handle portion 14 has two contacts positioned to mate with the springs when the main handle 16 tactilely receives the handle portion 14. Many variations and modifications may be made to the above-described designs for connection between the handle portion 14 and main handle 16 without departing substantially from the spirit and principles of the invention.

The food thermometer 10 can be constructed from any of a variety of different materials. The piercing element 18, for instance, can be made of heat-resistant stainless steel. The main handle 16 and handle portion 14 can be made of commercial grade aluminum. Other materials useful for the construction of the food thermometer 10 will be apparent to those having ordinary skill in the art.

Figure 11:
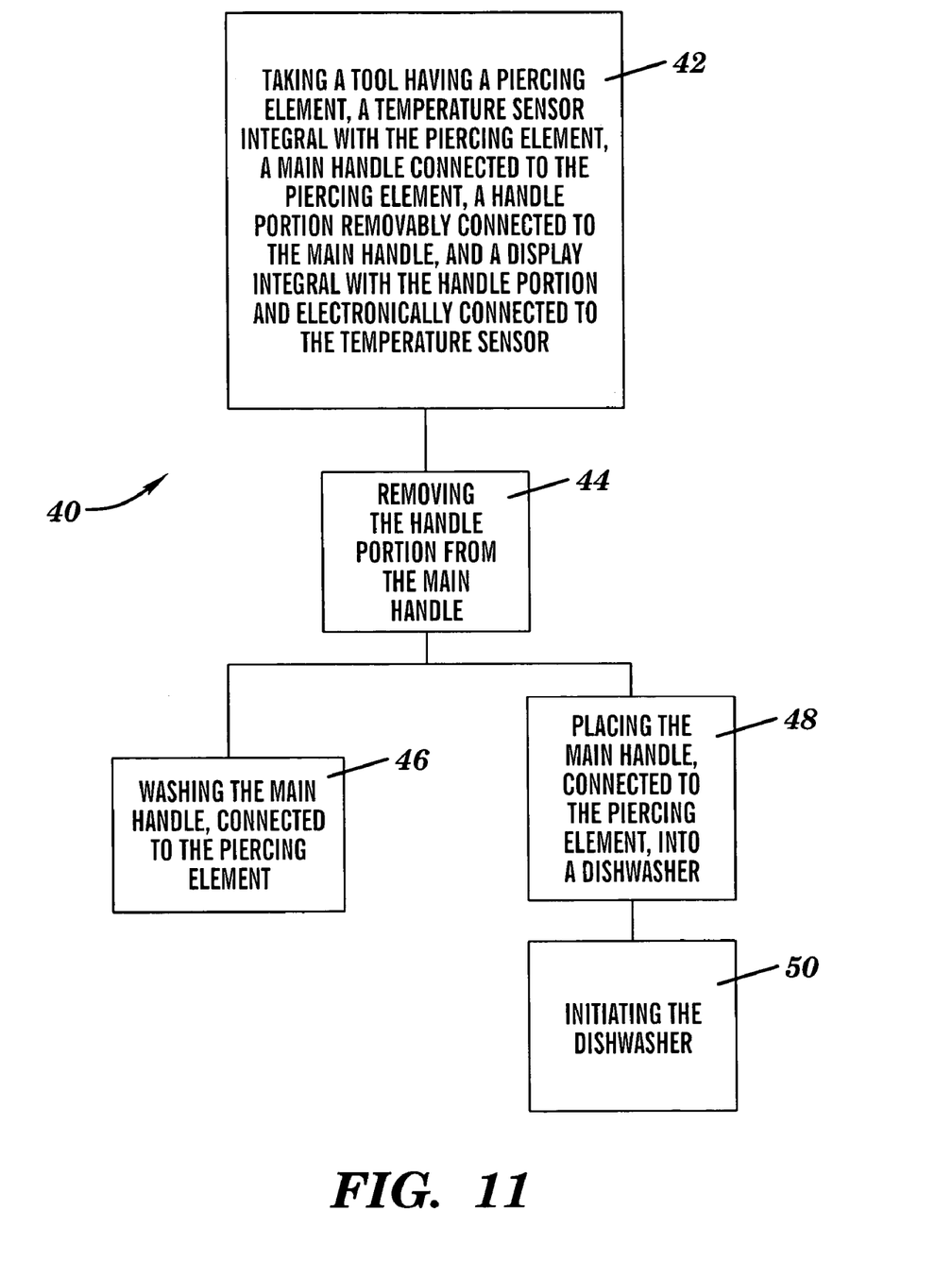
FIG. 11 is a flow chart illustrating a use of the present invention.

FIG. 11 is a flowchart illustrating the architecture, functionality, and operation of a possible implementation of the food thermometer 10 of FIG. 1. In this regard, each block represents a module or segment, which comprises one or more executable instructions for implementing the specified function(s). It should also be noted that in some alternative implementations, the functions noted in the blocks may occur out of the order noted in the flow charts. For example, two blocks shown in succession may in fact be executed substantially concurrently or the blocks may sometimes be executed in the reverse order, depending upon the functionality involved, as will be further clarified hereinbelow.

The food thermometer 10 provides methods for cleaning a food temperature-determining tool in a dishwasher. In this regard, the following steps can broadly summarize one embodiment 40 of such a method, among others. One step is taking 42 a tool having a piercing element 18, a temperature sensor 20 integral with the piercing element 18, a main handle 16 connected to the piercing element 18, and a handle portion 14 removably connected to the main handle 16, having a display 22 integral within the handle portion 14, electronically connected to the temperature sensor 20. Another step is removing 44 the main handle 16 from the handle portion 14. Another step is washing 46 the main handle 16, connected to the piercing element 18. The step of washing 46 the main handle 16 may be completed by placing 48 the main handle, connected to the piercing element, in a dishwasher and initiating 50 the dishwasher.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. An apparatus for determining food temperature, said apparatus comprising:
    a piercing element;
    a temperature sensor integral with the piercing element;
    a main handle connected to the piercing element;
    a handle portion removably connected to the main handle; and
    a display integral within the handle portion, electronically connected to the temperature sensor, whereby a temperature sensed by the temperature sensor is displayed by the display,
    wherein the main handle forms one end of the entire apparatus while the main handle is connected to the handle portion.

2. The apparatus of claim 1 wherein the display includes a doneness scale containing multiple stages of doneness.

3. The apparatus of claim 1 wherein the piercing element is heat-resistant stainless steel.

4. The apparatus of claim 1 wherein the main handle and the handle portion are commercial-grade aluminum.

5. The apparatus of claim 1 further comprising a button electronically connected to the display and used to scroll through a set of options on the display.

6. The apparatus of claim 1 wherein the display further comprises light emitting diodes.

7. The apparatus of claim 1 wherein the piercing element is a single tine.

8. The apparatus of claim 1 wherein the handle portion further comprises a first set of spring-loaded contacts positioned to mate with a second set of contacts on the main handle.

9. The apparatus of claim 1 wherein the display contains a digital temperature reading of the sensed temperature.

10. The apparatus of claim 1 wherein the piercing element is a fork having a plurality of tines.

11. The apparatus of claim 10 further comprising a plurality of temperature sensors, wherein each temperature sensor is integral with one of the plurality of tines on the multi-tined fork.

12. The apparatus of claim 1 wherein the display is rotatable.

13. The apparatus of claim 12 further comprising a motion sensor integral to the display, wherein the motion sensor automatically rotates the display whereby an image in the display is substantially upright.

14. An apparatus for determining food temperature, said apparatus comprising:
    a piercing element;
    a temperature sensor integral with the piercing element;
    a main handle connected to the piercing element;
    a handle portion removably connected to the main handle; and
    a display integral within the handle portion, electronically connected to the temperature sensor, whereby a temperature sensed by the temperature sensor is displayed by the display, the display being positioned between two ends of the main handle.

15. The apparatus of claim 14, wherein the piercing element is a fork having a plurality of tines.

16. The apparatus of claim 14, wherein the piercing element is heat-resistant stainless steel.

17. The apparatus of claim 14, wherein the main handle and the handle portion are commercial-grade aluminum.

18. The apparatus of claim 14, wherein the handle portion further comprises a first set of spring-loaded contacts positioned to mate with a second set of contacts on the main handle.

19. A system for determining food temperature, said system comprising:

a means for sensing food temperature insertable into food items for sensing the temperature of the food;

a means for holding, for holding the means for sensing food temperature;

a means for displaying, for displaying the temperature of the food items, the means for displaying being positioned between two ends of the means for holding; and a means for reattaching for temporarily separating the means for displaying from the means for holding thereby permitting washing the means for sensing temperature without damaging the means for displaying.

20. The system of claim 19 further comprising a means for rotating for automatically rotating the means for displaying, keeping the means for displaying in a substantially upright position.

21. The system of claim 19 wherein the means for displaying further includes a means for doneness for displaying a doneness of the food items in accordance with a scale of doneness.

22. The system of claim 21 further comprising a means for selecting for selecting a food type to be associated with the means for doneness.

23. A method for cleaning an apparatus for determining food temperature, wherein the apparatus comprises a piercing element; a temperature sensor integral with the piercing element; a main handle connected to the piercing element; a handle portion removably connected to the main handle; and a display integral within the handle portion, electronically connected to the temperature sensor, wherein the main handle forms one end of the entire apparatus while the main handle is connected to the handle portion, said method comprising the steps of:

removing the main handle from the handle portion;

and washing the main handle connected to the piercing element.

24. The method of claim 23 wherein the step of washing the main handle connected to piercing element further comprises the steps of: placing the main handle, connected to the piercing element, into a dishwasher; and initiating the dishwasher.

25. The method of claim 23 further comprising the steps of: drying the main handle connected to the piercing element; and reattaching the handle portion to the main handle.

* * * * *

UNITED STATES PATENT AND TRADEMARK OFFICE
CERTIFICATE OF CORRECTION

| | | |
|---|---|---|
| PATENT NO. | : 7,104,682 B2 | |
| APPLICATION NO. | : 10/797269 | |
| DATED | : September 12, 2006 | |
| INVENTOR(S) | : Kenneth David Harris, Jr. et al. | |

It is certified that error appears in the above-identified patent and that said Letters Patent is hereby corrected as shown below:

Title page:

Item [73], Assignee, delete "Brockstone," and substitute -- Brookstone -- in its place.

Signed and Sealed this

Fifth Day of December, 2006

JON W. DUDAS
*Director of the United States Patent and Trademark Office*